Jan. 30, 1945. G. A. LYON 2,368,236
WHEEL STRUCTURE
Original Filed Jan. 21, 1941
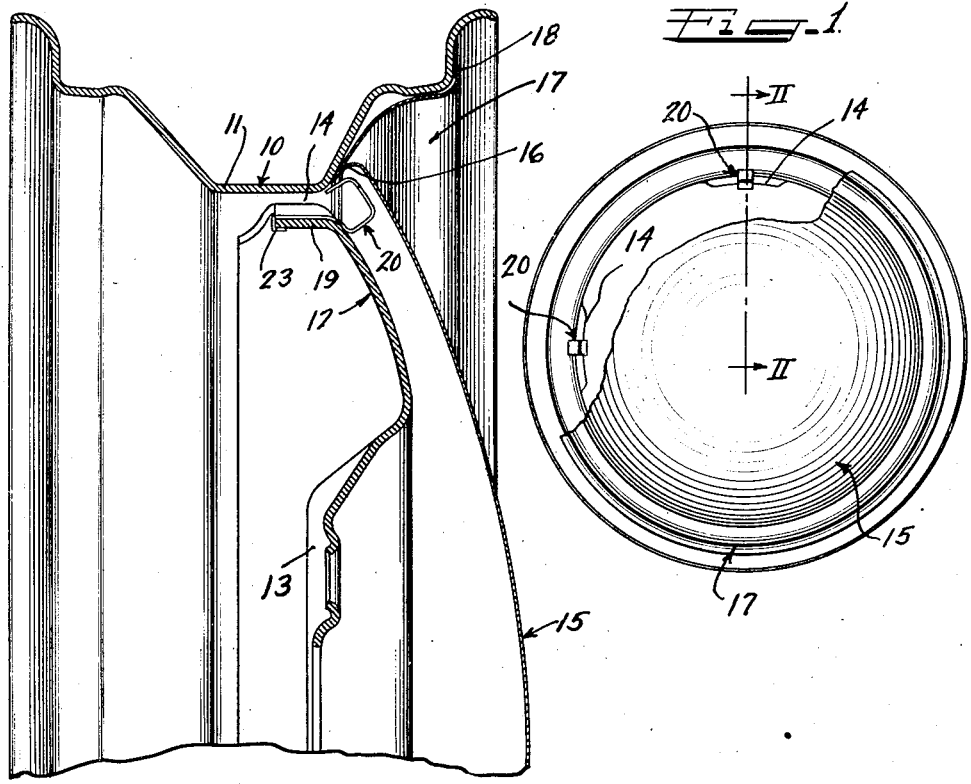
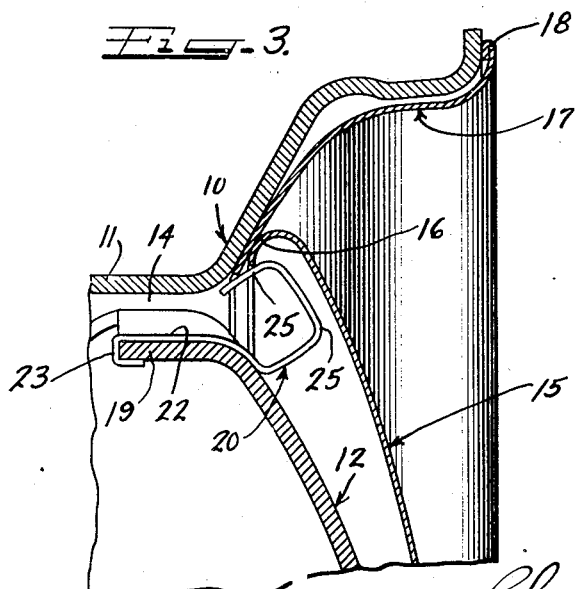
Inventor
GEORGE ALBERT LYON.
by Charles W Hills Attys.

Patented Jan. 30, 1945

2,368,236

UNITED STATES PATENT OFFICE 2,368,236

WHEEL STRUCTURE

George Albert Lyon, Allenhurst, N. J.

Original application January 21, 1941, Serial No. 375,172. Divided and this application May 29, 1942, Serial No. 444,944

4 Claims. (Cl. 301—37)

This invention relates to a wheel structure, and more particularly to one wherein there is provided novel snap-on cover-retaining spring clips. This invention has been divided from my copending application, Serial No. 375,172, filed January 21, 1941.

An object of this invention is to provide in a wheel structure cover-retaining spring clips which may be readily axially inserted in and interlocked with the spider of the wheel and which do not require any alteration in the wheel structure in order for them to be retained on the wheel.

Another object of this invention is to utilize the spaced openings in a wheel body or spider part as a means for accommodating a plurality of spring clips of such construction that the spring clips may be readily slid rearwardly and then forwardly into retained engagement with the wheel at said openings.

Still another object of this invention is to provide a novel cover-retaining spring clip which may be interlocked into retained engagement with a wheel at an opening separating the spider or body part of the wheel from the rim part.

In accordance with the general features of this invention, there are provided in a wheel structure rim and body parts connected together at spaced intervals with openings in the body part separating the connections, and in which openings are detachably retained a plurality of cover-retaining spring clips, the cover being retained on the spring clips by merely snapping it over and into yieldable and detachable engagement with free portions of the spring clips.

In accordance with other features of the invention, I have provided a retaining spring clip including an outer portion and a rear portion constructed and arranged to be hooked over the spider part at the corresponding opening in the spider part.

Other objects and features of this invention will more fully appear from the following detailed description, taken in connection with the accompanying drawing, which illustrates a single embodiment thereof, and in which:

Figure 1 is a side view of a wheel structure embodying the features of this invention and in which the cover has been broken away in order to show the spring clip;

Figure 2 is an enlarged fragmentary cross-sectional view taken on the line II—II of Figure 1; and Figure 3 is an enlarged fragmentary cross-sectional view corresponding to the upper right-hand portion of Figure 2 and showing clearly the hook-on coaction of my novel spring clip with the corresponding body or spider part at an opening in the spider.

As shown on the drawing:

The reference character 10 designates generally a multi-flanged drop center type of tire rim which is connected by rivets or welding at spaced intervals through a base flange 11 to a central body part or spider 12, which includes the usual central bolt-on flange 13. The connections between the body part 12 and the rim part 10 are separated by openings 14 in the body part, and it is the object of this invention to utilize those openings in the retention of the cover-retaining spring clips on the automobile wheel.

I have designated the spring clips by the reference numeral 20, and inasmuch as the spring clips are identical, a description of one will suffice for all. These spring clips are illustrated as retaining in position a disk-like cover or hub cap 15 having a turned outer edge 16 in retained engagement with the spring clips 20 and also in overlapping relation with the radially inner edge of an ornamental trim ring 17. This trim ring 17 is disposed over the outer surface of the side flanges of the rim part 10 and has a turned outer edge 18 for strengthening the edge and preventing anyone cutting his hands on the edge. The cover member 15 and trim ring 17 may be made of any suitable sheet material, such, for example, as stainless steel sheet of .020" in thickness. Both of these parts are held in proper cooperation with the wheel by means of the spaced spring clips 20.

The spring clips 20 are made of spring steel and are bent into the form best shown in Figure 3. Each of these clips includes a hook-like or looped outer free yieldable end 21 including a rearwardly turned obliquely extending portion 25 which bears against the inner edge of the cover member 15 to hold it on the wheel and in retaining cooperation with the trim ring 17. It will be noted that the inclination of the portion 25 is such that the portion is disposed at a substantial angle to the vertical, and of such moment that proper retaining tension can be applied to the edge 16 of the cover member 15.

Each of the clips also includes a rearwardly and horizontally extending portion 22 terminating a hook 23 adapted to be hooked over the rear edge 19 of the spider or body part 12 at one of the openings 14.

In mounting this clip 20 on the wheel, the leg or portion 22 is inserted axially through the opening 14 until its hook-like extremity 23 is beyond the edge 19. Then the hook-like end 23 is snapped or hooked over the edge 19, thus locking the clip to the body part 12.

In the application of the trim ring 17 and wheel cover member 15 to the wheel, the trim member 17 is first placed over the tops of the yieldable portions 21 of the clips until it is in the position shown in Figure 3. Thereafter the cover member 15 is similarly pressed over the tops of the portions 21 of the clips until it is in the retained position shown in Figure 3. It will be noted that the inclined portion 25 of each of the clips, as shown in Figure 3, may engage the inner edges of both the ring 17 and the cover member 15. These two cover members 15 and 17 are held on the wheel solely by reason of the resilient stress exerted by the spring clips, and which is occasioned by their being deflected from their normal positions when the edge of the covering element or member is in retaining engagement therewith. In this respect, it should be noted that the inclined ends 25 of the clips are disposed in a circle of a diameter slightly in excess of the diameter of the turned edge 16, and as a consequence it follows that the ends 25 are deflected radially inward as the edge of either the cover member 15 or of the trim ring 17 passes over the outer portions 21 of the clips. Thereafter the ends 25 are under resilient stress, and as a consequence force the cooperating edges of the member 15 and ring 17 toward and into cooperation with the side flanges of the rim part 10.

When it is desired to remove the cover member 15 from the wheel, it is only necessary to insert the end of a screw driver or other suitable tool under the turned edge 16 and forcibly pry it off the spring clips. Similarly, the trim ring 17 may be pried loose from its cooperation with the spring clips by inserting a screw driver under its outer edge 18.

From the foregoing, it is clear that I have provided a novel cover or ring retaining spring clip which may be mounted on a wheel by merely pressing it axially into position in the corresponding opening 14 of the wheel and then pulling it outwardly to lock its inner extremity 23 with the edge 19 of the spider. No additional means of any nature or kind other than the clip itself is needed to hold the clip on the wheel. Moreover, it cannot come free, since once it is locked to the edge 19, its inclined portion 25 would strike the base flange 11 of the rim part and prevent an accidental rearward disengagement of the hook 23 from the edge 18.

It should be noted that in the accompanying claims I have used the term "cover member" in a generic sense to include either a solid disk cover or an annular covering ring.

I claim as my invention:

1. In a wheel structure, a wheel including tire rim and body parts connected together at spaced intervals with spaced openings between connections, and a plurality of cover-retaining spring clips at said openings, each of said clips being held in said openings solely by a hooked-on engagement with one of the wheel parts and held against removal by an enlarged end axially outward of the corresponding opening and formed to apply pressure against both of said wheel parts.

2. In a wheel structure, a wheel including tire rim and body parts connected together at spaced intervals with spaced openings between connections each defined on one side by an indented flange part of the wheel body part, a plurality of cover-retaining spring clips at said openings, each of said clips being held in said openings solely by a hooked-on engagement with one of the wheel parts and having an outer turned portion bearing on and backed up by said body part indented flange, and a wheel cover member for concealing said openings and having an edge snapped over and into retained engagement with said spring clips.

3. In a wheel structure, a wheel including tire rim and body parts connected together at spaced intervals with spaced openings between connections defined in part by an indented flange of the body part, and a plurality of cover-retaining spring clips at said openings, each of said spring clips being held in position in said openings solely by a hooked-on engagement with one of the wheel parts and including a yieldable outer loop portion for cooperation with a cover member and an inner leg portion in the aforesaid hooked-on engagement in the corresponding wheel opening, said outer portion overlapping said indented flange radially beyond the corresponding opening so as to prevent shifting of the clip.

4. In a wheel structure, a wheel including tire rim and body parts connected together at spaced intervals with spaced openings between connections, and a plurality of cover-retaining spring clips at said openings, each of said spring clips being held in said openings solely by a snap-on fit in said wheel parts, each of said spring clips including an outer bent end with an inclined portion for engaging an edge of a cover part and having a leg portion extending through one of said openings and provided at its rear end with a hook-like extremity for hooking over an inner edge of the body part at the corresponding opening to retain the spring clip in position on the wheel, said outer end also bearing against the body part so as to be backed up thereby in applying retaining pressure to the cover part.

GEORGE ALBERT LYON.